June 24, 1958  H. C. ALMESTAD  2,840,147
AUTOMOBILE FUEL TANK
Filed May 31, 1955  2 Sheets-Sheet 1

INVENTOR.
HENRY C. ALMESTAD

June 24, 1958 — H. C. ALMESTAD — 2,840,147
AUTOMOBILE FUEL TANK
Filed May 31, 1955 — 2 Sheets-Sheet 2
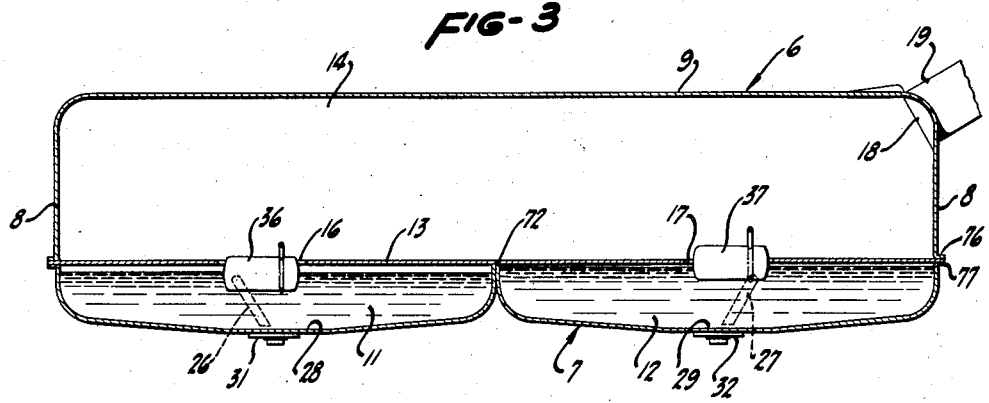
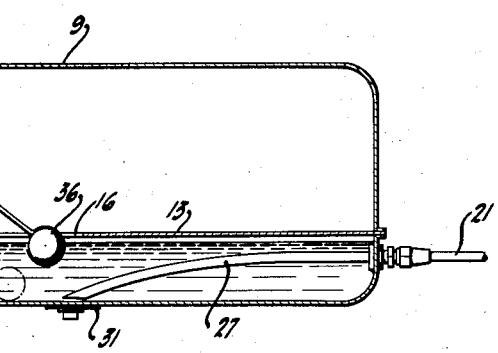
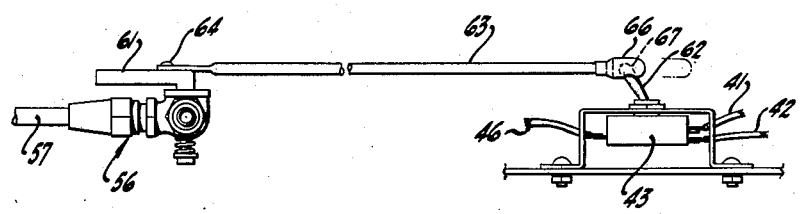
INVENTOR.
HENRY C. ALMESTAD 2,840,147

AUTOMOBILE FUEL TANK

Henry C. Almestad, Berkeley, Calif.

Application May 31, 1955, Serial No. 511,909

2 Claims. (Cl. 158—46.5)

The invention relates to gasoline tanks for automotive vehicles which are constructed to provide a separate emergency fuel compartment which may be called upon when the automobile has otherwise "run out of gas."

The need for and the many advantages afforded by a fuel tank of the character described have long been recognized. However, various constructions which have been proposed are relatively complicated and difficult to make and not at all suited for mass production, which is required in the automotive industry. It is accordingly an object of the present invention to provide an automotive fuel tank of the character above which will provide a greatly simplified form of construction and which, while affording all of the desired advantages of the more cumbersome arrangements heretofore proposed, may be easily and inexpensively mass produced.

Another object of the present invention is to provide an automobile fuel tank incorporating two identical emergency storage compartments operating interchangeably with the main fuel tank and with a pair of standard type float gauges, the conventional dashboard gauge, and a manually operable selector valve and electric switch to automatically hold one of the compartments in reserve while fuel as recorded on the dashboard gauge is withdrawn from the main tank and other compartment, thus making it impossible to "run out of gas" unless both compartments are deliberately emptied.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 2 is a cross sectional view of the tank taken substantially on the plane of line 2—2 of Figure 1.

Figure 3 is a cross sectional view of the tank taken substantially on the plane of line 3—3 of Figure 1.

Figure 4 is a side elevation of the manual selector valve and electric switch used with the tank.

Figure 1:
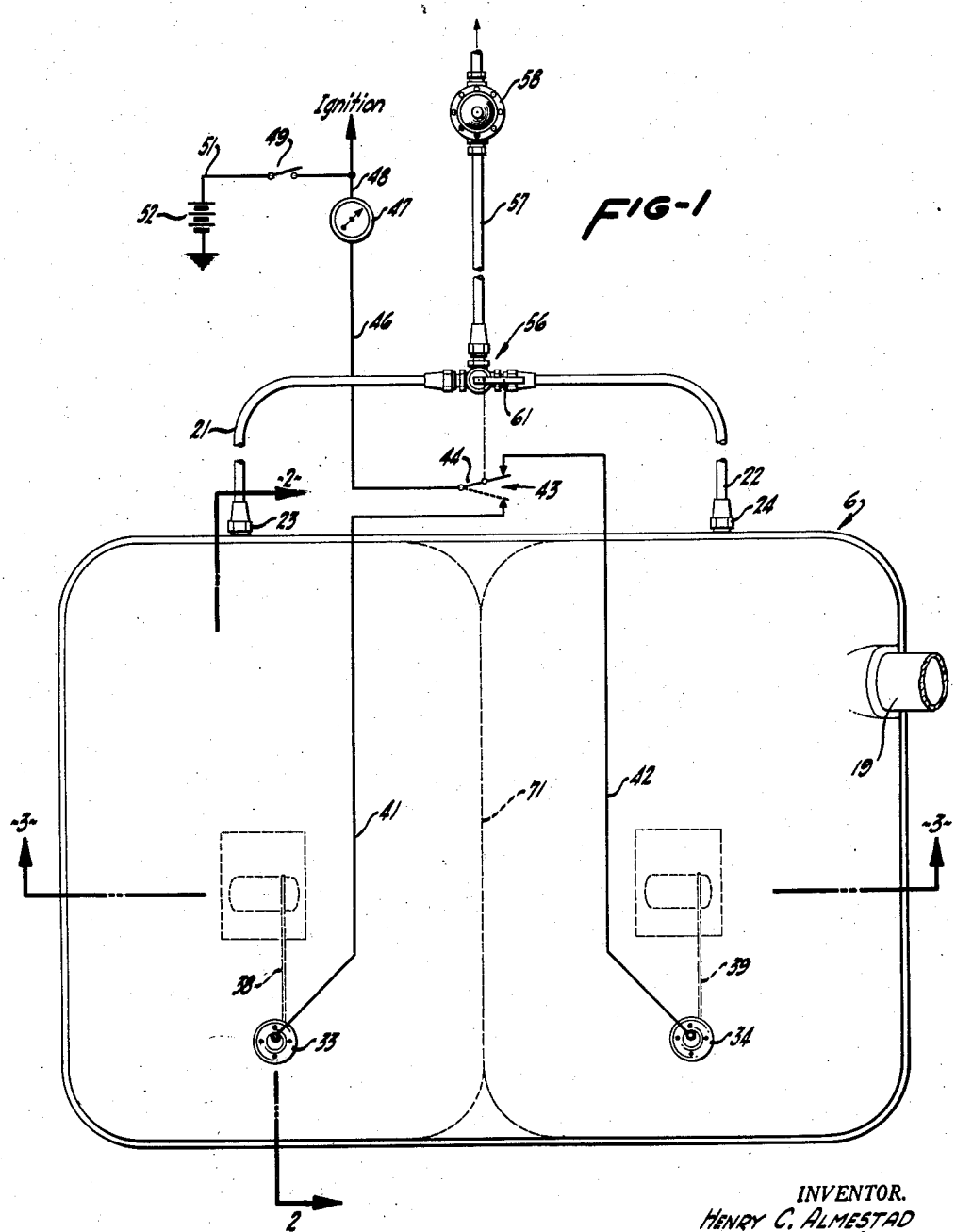
Figure 1 is a plan view of an automobile fuel tank constructed in accordance with the present invention.

The automobile fuel tank of the present invention and as illustrated in the accompanying drawings consists, briefly, of a container 6 having bottom, side and top walls 7, 8 and 9 defining a sealed enclosure, the bottom wall 7 in the present instance being formed with a pair of side by side wells 11 and 12, and a baffle plate 13 extending across the interior of the container between the side walls 8, and providing a closed top for the wells to divide the interior of the tank into a main chamber 14 above the plate and a pair of compartments below the plate, as provided by the wells 11 and 12. As here shown, the plate 13 is provided with openings 16 and 17 which communicate the compartments 11 and 12 with the main chamber 14. The container is formed with a filler opening 18 in the top wall 9 which is connected to a fuel inlet conduit 19. Fuel thus entered into the main chamber 14 will flow over the top of the baffle plate 13 and through the openings 16 and 17 into the wells 11 and 12, thus automatically filling these wells whenever the tank is refueled. Fuel is removed from the tank by a pair of fuel conduits 21 and 22, which are here connected by fittings 23 and 24 to the side wall of the tank at the wells 11 and 12 and are provided with suction tubes 26 and 27 which extend from the fittings 23 and 24 to the bottoms 28 and 29 of the wells. Drain plugs 31 and 32 may be provided in the bottoms 28 and 29 for draining the compartments and providing access thereto as required.

In accordance with the present invention, a pair of conventional float gauges 33 and 34 are mounted on the top wall 9 of the tank, and are provided with a pair of floats 36 and 37 which are mounted on arms 38 and 39 for vertical displacement between the bottoms 28 and 29 of the wells 11 and 12 and the top of the main chamber 14. In this connection the openings 16 and 17 are dimensioned to pass the floats 36 and 37 and their arms 38 and 39 for free swinging vertical displacement from the bottom to the top of the tank, as best seen in Figures 2 and 3. The rheostat elements of the float gauges 33 and 34 are connected by electrical conductors 41 and 42 to a single pole double throw switch 43, the selector contact 44 of which is connected by electrical conductor 46 to the conventional dashboard gauge 47. As here shown, the gauge 47 is connected by conductor 48 to the ignition switch 49 and thence by conductor 51 to the battery 52, which is the usual practice. As will be seen from this arrangement, the switch 43 may be manually displaced to cause the gauge 47 to record the output of either of the float gauges 33 or 34 reading the fuel content in the main chamber 14 and the indivdual compartments 11 and 12.

In keeping with the dual electrical controls provided as above, the fuel conduits 21 and 22 are connected to a manually controlled multiple selector valve 56, which is in turn connected by conduit 57 to the fuel pump 58 of the automobile for supply to the carburetor.

The valve 56 is here of the simple rotary cock T form, and is provided with a handle 61 which may be manually engaged and displaced to rotate the cock to a position passing fuel from conduit 21 to conduit 57 while closing off conduit 22, or may be rotated to another position passing fuel from conduit 22 to conduit 57 while closing off conduit 21. Preferably and as here shown in Figure 4, the valve arm 61 is operatively connected to the switch arm 62, controlling the position of selector contact 44, so that the electric switch 43 will select the gauge associated with the well from which fuel is being drawn. As here shown, a link 63 is pivotally connected, as by pivot pin 64, to the handle 61 eccentrically to the axis of rotation of the plug cock of the valve. The opposite end 66 of the link 63 is formed with a socket which fits over and provides a universal swivel type connection with a ball end 67 provided on the arm 62. As will be observed from Figure 4, swinging of valve handle 61 through an arc of 90 degrees from one of its selected positions to the other, will cause a sufficient displacement of the opposite end 66 of the link to displace the switch arm 62 between its two selector positions. A standard single pole double throw toggle switch may be used for this purpose, although as will be understood, the synchronized, coordinated action between the valve and the electric switch may be obtained with valves and switches of forms other than as specifically herein depicted. Preferably the valve and switch should be semi-conveniently located, such as under the trunk compartment deck where the same may be available for operation by lifting a small cover inside the trunk compartment. If desired, a remote control handle could be placed on or near the dashboard for operation of the valve and switch.

Preferably the wells 11 and 12 are formed of identical capacity and the baffle plate 13 is secured along a medial line 71 to the contiguous top edge 72 provided by the side to side positioning of the wells 11 and 12. The identical sizing of the two wells makes them interchangeably usable with the main fuel tank and the pair of float gauges to always provide a correct reading of the available fuel content at the dashboard gauge. The securing of the baffle along the medial line 71 to the contiguous edge 72 of the wells assists in keeping the fuel from swashing from one compartment to the other, and also retains the fuel within the compartment while the vehicle is on a slope.

As will be observed, the compartmentalizing of the tank is achieved simply, and the interchangeable operation of the identical emergency storage compartments effected without the use of any moving parts other than in the valve 56. As will also be observed, the structure is very well suited to simple and inexpensive mass production, which may be carried out with existing types of production facilities now available in the manufacture of gasoline tanks. For example, the two compartments 11 and 12 are preferably provided, as here shown, with a pair of generally rectangular open top pans which may be pressed out of sheet steel or the like and positioned in side to side relation, as seen in Figure 3, with a weld seam run across the contiguous sides so as to define the top edge 72 above referred to. The baffle plate 13 may be blanked out of sheet steel or the like of generally rectangular form and mounted on the top of the pans with the periphery of the plate substantially contiguous with the perimeter of the joined pans. The top and side walls 9 and 8 may be provided by an inverted dish shaped cover having a lower rim 76 mounted on the plate 13 in substantial registration with the contiguous peripheries 77 of the plate and bottom pans. The assembly may then be simply completed by welding the rim 76 to the plate and pan peripheries 77 in a single unitary peripheral weld which in one pass picks up the two bottom pans and the baffle plate and the top cover. The emergency compartments should each hold at least two gallons and the overall tank is not necessarily increased in size over the usual size automobile gasoline tanks.

The operation of the automobile fuel tank and auxiliary controls will be clear from the foregoing and may be briefly summarized as follows. Fuel is fed into the tank through the conduit 19 in the usual fashion, filling the entire interior of the tank including both of the emergency reserve compartments 11 and 12. Assuming thereafter that the valve 56 is set to remove fuel through conduit 21, switch 43 will be automatically positioned to connect the float gauge 33 associated with the well 11 so as to properly read the fuel content in the main chamber 14 and the compartment 11 available for withdrawing. As the fuel level drops in the tank, fuel will be trapped in compartment 12 and held therein after all fuel is exhausted from compartment 11 and the car has "run out of gas." At such time the operator needs only turn the valve handle 61 so as to take fuel from compartment 12, and is thus permitted to continue on his way until a service station is reached. There is no need for the operator to again change the position of valve 56 upon filling of the fuel tank, since thereafter the apparatus may be set so as to take fuel from compartment 12 and to use a float gauge 34 associated therewith for providing the fuel content reading at gauge 47.

I claim:

1. An automobile fuel tank comprising, a container having bottom and side and top walls defining a sealed enclosure, said bottom wall being formed with a pair of side by side wells, a baffle plate extending across the interior of said container between said side walls and providing a closed top for said wells to define a first compartment above said plate and second and third compartments below said plate provided by said wells, a pair of float gauges having floats mounted for vertical displacement between the bottom of said wells and the top of said first compartment, said plate having openings communicating said second and third compartments with said first compartment and being dimensioned to pass said floats, a pair of fuel conduits connected to said bottom wall in communication with and positioned for draining said wells, a selector valve connected to said conduits for selecting the well from which fuel is drawn, and an electric selector switch connected to said float gauges and being connected for operation with said valve so as to select the gauge associated with the well from which fuel is drawn.

2. An automobile fuel tank comprising, a pair of generally rectangular open top pans mounted in side by side relation and connected to provide a contiguous top edge extending medially across said pans, a generally rectangular baffle plate mounted on the top of said pans and secured to said contiguous top edge and positioned with the periphery of said plate substantially contiguous with the perimeter of the joined pans, an inverted dish shaped cover having a lower rim of generally rectangular form mounted on said plate in substantial registration with the peripheries of said plate and bottom pans and being unitarily secured thereto to define a sealed enclosure with a chamber above said plate provided by said cover and a pair of compartments below said plate provided by said pans, said cover being formed with a filler opening communicating with said chamber, a pair of float gauges having floats mounted for vertical displacement through said compartments and chamber, said plate having openings communicating said chamber with said compartments and being dimensioned to pass said floats, a pair of fuel conduits connected to said pans, a selector valve connected to said conduit for selecting the compartment from which fuel is drawn, and an electric selector switch connected to said float gauges and being connected for operation with said valve so as to select the gauge associated with the compartment from which fuel is drawn.

References Cited in the file of this patent

UNITED STATES PATENTS

| 766,566 | Witt | Aug. 2, 1904 |
| 1,494,978 | Roy | May 20, 1924 |
| 1,798,300 | Arlt | Mar. 31, 1931 |
| 2,223,432 | Smith | Dec. 3, 1940 |
| 2,316,116 | Thompson et al. | Apr. 6, 1943 |
| 2,356,200 | Bedard | Aug. 22, 1944 |
| 2,389,168 | Snyder | Nov. 20, 1945 |

FOREIGN PATENTS

| 807,252 | Germany | June 28, 1951 |
| 453,677 | Great Britain | Sept. 16, 1936 |